United States Patent [19]
Hogan

[11] 3,966,109
[45] June 29, 1976

[54] SOLDERING AID

[76] Inventor: James Edward Hogan, 7 Harvard St., South Hadley, Mass. 01075

[22] Filed: May 2, 1975

[21] Appl. No.: 573,874

[52] U.S. Cl. .................................................. 228/52
[51] Int. Cl.² ........................................... B23K 3/06
[58] Field of Search ................. 228/52, 51, 53, 128

[56] References Cited
UNITED STATES PATENTS 3,707,258  12/1972  Schlitt.................................. 228/52

Primary Examiner—Al Lawrence Smith
Assistant Examiner—Margaret Joyce

[57] ABSTRACT

A feeding device for solder in string form is equipped to advance a measured length of that string, when a finger clamp is actuated by a hand pulled two-arm lever. The finger clamp is pivoted and spring loaded on the free end of this lever; it clamps the solder string against a fixed lug of the hand lever, while the string is being pushed through a protective tube toward a soldering spot by a lever stroke. The stroke is halted by a stop. When the lever is released by hand, a return spring pulls the free lever end back toward a reel of rolled-up string. Meanwhile a finger of the finger clamp is sliding back along the string without gripping it, as the backward stroke of the hand lever takes the finger lock out of contact with the string. The Soldering Aid enables the solderer to use his free hand to pull in and hold wires in a compact electronic device. Without this aid, the same hand would be busy to feed solder at the risk of heating and damaging capacitors, thin plastic insulation or frame walls. Any type of solder, including silver solder with a flux core, may be used.

10 Claims, 4 Drawing Figures

U.S. Patent June 29, 1976  3,966,109
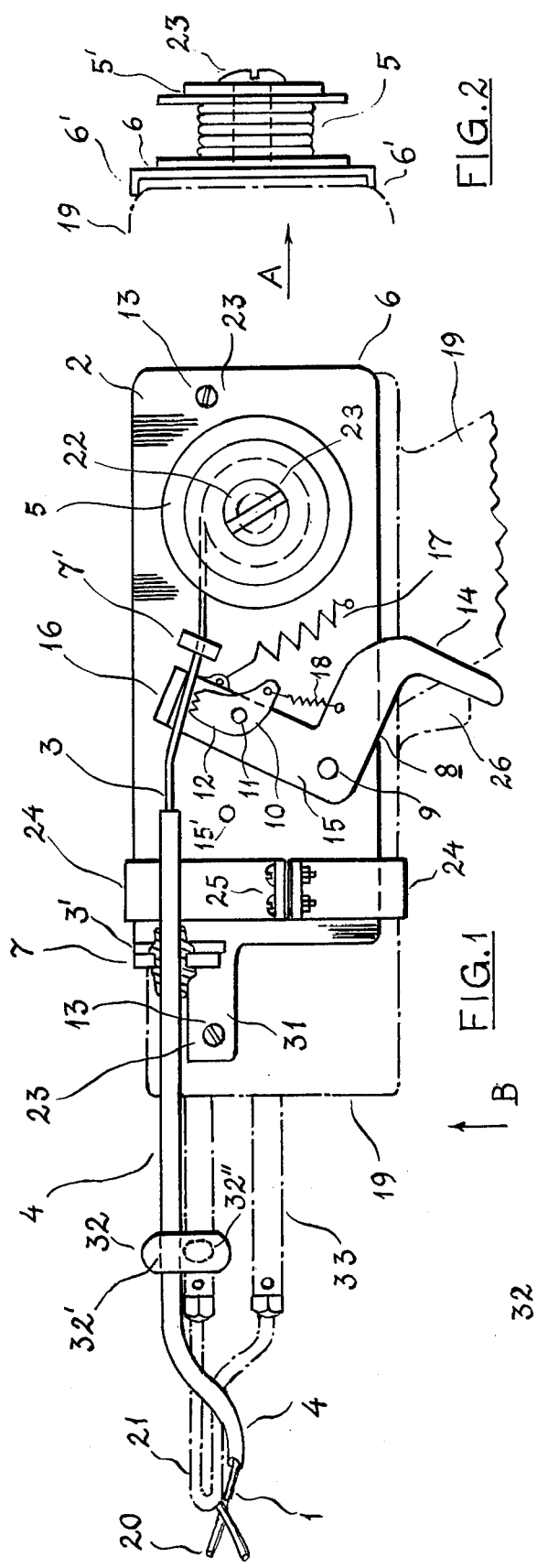
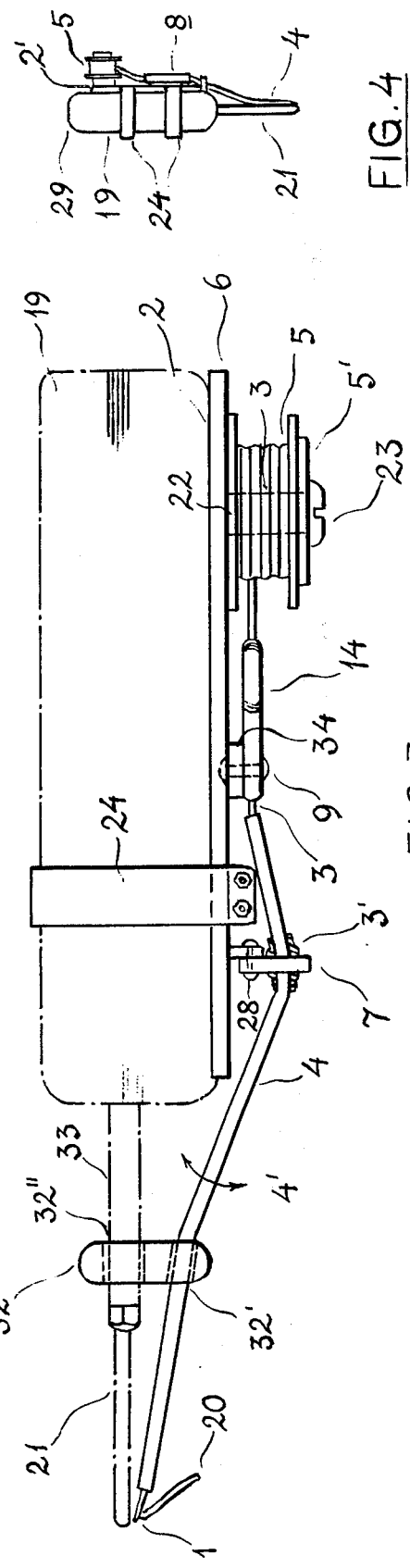

SOLDERING AID

The Soldering Aid according to the invention comprises a feeding device and an adjustably fixed protective tube, both of which, in combination, feed the needed amount of solder string to the soldering spot under control of the same working hand, that triggers the soldering gun. The feeding device comprises a base plate, a hand lever, pivoted in its middle on the plate; a reel, carrying wound - up solder string and being likewise pivoted on the base plate. The hand lever has a handling arm and a free locking arm. A finger clamp is pivoted on the locking arm, which is ending in a counterhold lug, designed to co-operate with the finger clamp in locking a solder string, guided in a gap between the lug and the finger clamp of the locking arm. This arm pushes a length of solder string onto the soldering spot through a protective tube mounted outside the stroke of that arm above the base plate.

The invention is clearly shown by an example in the drawings.

FIG. 1 is a front view of the Soldering Aid;

FIG. 2 is a side view of the same, seen in direction of arrow A, yet omitting all parts, mounted on the base plate, except the solder string reel;

FIG. 3 is a ground view, seen in direction of arrow B; and

FIG. 4 is a special application.

In FIG. 1 the Soldering Aid is aimed with its solder string 3 toward a soldering spot 1. A base plate 6, made of plastic or metal, carries on a post 22 a storage reel 5, held between a lid 5' and the rear part 2 of the flat base. This base has flanges 6' along its longer edges, as best seen in FIG. 2. The flanges have two purposes: to give the base a good grip on the curved surface 19 of the soldering gun, outlined by a dash - dot line, and to provide room for rivet heads and screw heads between the base plate and the soldering gun or torch, to which it is attached by screws 23. As these screws are longer, than the ones that fasten the parts of the gun housing together, they fasten here the base plate as well, using the same housing holes 13. If needed, an extension 31 of the base plate is made. To allow the solderer a free look upon the work 20, even if only a narrow room allows getting close with the heating device, holes in the far back of the device are used. A thin strap 24 of aluminum or plastic coated fiberglass holds together the heating device and the front of the Soldering Aid by means of a buckle or screw plates 25, joining the ends of the strap.

Referring to the feeding mechanism, a hand lever 8 is shown pivoted at 9 on the base plate 6 over a spacer 34. The lever 8 has a locking arm 15 and a handling arm 14, which is bent, to let the solderer's finger have a hold of it, even if he pulls a trigger 26 of a heating device at the same time. On the locking arm 15 a finger clamp 10 has a pivot 11. The locking arm is ending in a perpendicular lug 16, that acts as a counterhold opposite a finger 12 of the finger clamp, if the solder string is caught between the finger 12 and the lug under control of the solderer. The solder string 3 is guided from the reel 5 by a fixed eye holder 7', which may be part of the base plate. When locked in the gap between finger and lug, the string may be pushed onto the soldering spot by a flick of the solderer's hand, swiveling the lever 8 and with it lock arm 15 and finger clamp 10 as well.

The locking arm has a coil spring 17, fastened between the base plate at 17' at an angle of about 60° against the arm, and the free end of arm 15. However, the return stroke of this arm is limited by the eye holder 7', acting as a stop. Forward strokes are stopped by a knob or lip 15', which may be formed out of the base plate. A coil spring 18 of the finger clamp is fastened between this clamp and the handling arm 14 at 18'. When the solderer pulls the handling arm, he swivels, by stretching the spring 18, the pivoted finger lock against the solder string. The latter is forced to ride along with the swing of the locking arm, thus feeding solder to the soldering process. On return to its rest position, the locking arm lets go of the string, as the pivot of the finger clamp is pulled slightly away from the string. The finger clamp 10 has a stop 10' on the locking arm.

The feeding path of the solder string would be fraught with danger of getting entangled, were it not for a protective tube 4 around the solder string; where the wiring is too tight, to get straight at the soldering spot, an adjustable eye holder 7, FIG. 4, is the only means of leading the protective tube around a protruding component of the wiring. After passing the hindrance by turning the holder 7 along the rotational arrows 4', the readjusted eye holder may lead the string to the soldering spot 1. A holder lug 27 on the base plate 6 contains a pivoting pin 28 for a metal eye holder 7, which may have its eye filled with a short sleeve 3' that keeps the tube 4 inside it from getting cuts by the edges of the eye. Far reaching tip holders 33 warrant a second eye support for the tube 4. A two-eye bead 32 of heat resisting matrial, such as fiberglass, sitting turnably on one tip holder with its second and much larger eye, will be set by hand. The tube in the first bead eye 32' will thus reach the soldering spot 1, lying under the end of the solder tip 21.

FIG. 4 shows how a special Soldering Aid may be fastened to a pin type or "pencil" - solder gun by two straps 24. On a rounded base plate 2', hugging a handle 29, a small platform 34' is carrying a pivoted string storage wheel 5, similar to the design in FIG. 3. as well as a hand lever.

I claim:

1. Soldering aid for handoperated feeding of measured lengths of soldering string to the heating wire tip of a soldering gun, having a trigger for control of heating intervals, which soldering aid comprises: a base plate, mounted above the trigger on one side of the soldering gun, a hand lever being pivoted near the lower edge of the central part of the base plate and having a handling arm extending approximately to a location parallel to the trigger and a locking arm extending in the opposite direction, a storage reel carrying a supply of soldering string and being pivoted on the rear part of the base plate, a protective tube mounted partially on the forward part of the base plate and partially in a hollow heat-resisting bead seated over the heating wire of a soldering gun; a springloaded finger clamp being pivoted on the locking arm, a lug attached to the free end of this arm and aligned as a counterhold for the finger clamp pressing against the soldering string when the hand lever is being swiveled for intermittent forward transport of soldering string which is drawn from the storage reel and pushed through the protective tube unto the heating wire tip, and further comprises a coil spring, as a means for keeping the finger clamp off any gripping contact with the soldering string when the locking arm is being swiveled in direction toward the storage reel, freeing the finger clamp for backsliding under the soldering string.

2. Soldering aid, as set forth in claim 1, wherein a stop is provided on the base plate as a limit for the forward strokes of the locking arm, and another stop is fastened to the locking arm between the pivot of the finger clamp and the hand lever pivot, which stop defines a rest position for the finger clamp.

3. Soldering aid, as set forth in claim 1, wherein the springloading of the finger clamp is provided by a coil spring, fastened between this clamp and a point on the handling arm, located at some distance from the hand lever pivot.

4. Soldering aid, as set forth in claim 1, wherein the locking arm has a return spring mounted at an angle of about 60° to this arm between a point near the lug and a point near the opposite edge of the base plate.

5. Soldering aid, as set forth in the claim 1, wherein a bead of heat-resisting material, formed with two eyes, is seating with one eye the protective tube near its far end, while with its other eye the bead is slipped over one wiretip holder of the soldering gun.

6. Soldering aid, as set forth in claim 1, wherein the solder string is led from the storage reel to the protective tube by means of an eye holder adjustably fastened on the base plate.

7. Soldering aid, as set forth in claim 1, wherein the base plate is attached to the soldering gun by fasteners, such as screws, using the customary housing holes of the soldering gun.

8. Soldering aid, as set forth in claim 1, wherein the base plate is fastened to the soldering gun by at least one strap, allowing a free look on the work by the solderer.

9. Soldering aid, as set forth in claim 1, wherein the rear end of the protective tube is seated in the eye hole of an adjustable eye holder, turnably fastened at a point between the far end of the forward stroke of the forward stroke of the locking arm and the front end of the base plate.

10. Soldering aid, as set forth in claim 1, wherein the protective tube has a first support by an eye holder, fastened on the base plate, and a second support on a wiretip holder of the soldering gun, and whereby the tube can be turned in such a way, that the feeding path of the soldering string is led around obstacles in the wiring setup on which the solderer is working.

* * * * *